INVENTOR.
ALWIN HAHNEL
BY
Daniel D. Sharp
ATTORNEY

United States Patent Office 3,131,370
Patented Apr. 28, 1964

3,131,370

SEARCH RECEIVER WHICH CORRECTS FOR MOTOR OVERSHOOT BY INTERCHANGE OF TWO OFFSET BAND PASS FILTERS

Alwin Hahnel, Rochester, N.Y., assignor to General Dynamics Corporation, Rochester, N.Y., a corporation of Delaware Filed Mar. 14, 1960, Ser. No. 14,940
9 Claims. (Cl. 334—22)

This invention relates to a signal seeking receiver and, more particularly, to a signal seeking receiver having a motor driven tuning means which, by virtue of the use of offset filters, prevents loss of a signal following the overshoot period of the motor driven tuning means.

Automatic search receivers generally use a local oscillator which is continuously swept in frequency until a desirable signal has been detected. The frequency sweep is then disabled and the mixer output frequency corrected by a fine tuning of the local oscillator so as to center the mixer output frequency in the passband of the filter circuitry following the mixer. Most applications of these receivers require a high frequency accuracy of the local oscillator. In many applications, it is desirable to use motor driven tuning elements as frequency determining components of the sweep oscillator.

In conventional receivers using motor driven tuning elements, the motor power supply is deenergized upon detection of a desired signal. Owing to the kinetic energy of the motor, however, the motor continues to rotate even after being deenergized, thereby driving the tuning element, or elements, past the optimum position at the instant of deenergization of the motor. Experience with wide-band search receivers indicates that the overshoot of the motor and the tuning element, or elements, is sufficient to move the signal out of the narrow passband of the receiver filter circuitry. This is particularly true in the case of receivers that must be sufficiently selective to maintain, under adverse transmission conditions, the signal-to-noise ratio within tolerable limits. This overshoot in conventional receivers necessitates, generally, the reversal of the direction of the motor drive and the return, at a reduced speed, to the position which centers the desired signal in the filter passband. This procedure requires considerable time which often is more than the time available for evaluation of the intercepted information. For example, the information to be received and analyzed may occur but once, or at random intervals of very short duration. If the information signal is lost, it may be a long time before that information signal again is available, if, indeed, the information ever recurs.

In accordance with the invention, the receiver signal channel includes two bandpass filters which are offset, so far as the center frequency is concerned, by a frequency difference corresponding to the largest expected overshoot of the motor driven tuning system past the position occupied at the time of a decision to deenergize the motor. When a signal having the desired characteristic is detected, a control signal is derived which is used to deenergize the tuner motor. At the same time, the filter previously in the signal channel of the receiver is switched out and the other filter is introduced into the signal channel. If the local oscillator is sweeping from a higher to a lower frequency, the mixer output frequency is increasing. Consequently, the first filter to be connected into the signal channel is the filter which is tuned to the difference between the signal frequency and the local oscillator frequency at the time the signal is first received and the motor is deenergized. Since the motor overshoots the optimal tuning position, the local oscillator frequency will have decreased by some amount, thereby increasing the mixer output frequency. Consequently, the second filter is tuned to a higher frequency than the first filter. If the local oscillator is being swept from a lower to a higher frequency, the filter which is tuned to the higher frequency is first introduced into the signal channel; upon the receipt of the control signal, this filter is replaced by the filter that is tuned to the lower frequency. Regardless of the direction of sweep, the signal will appear within the passband of the filter last introduced into the signal channel. Loss of signal during the motor overshoot period thus is averted.

In one type of operation according to the invention, particularly adapted to reception of information bursts which either are nonrepetitive or which recur at irregular intervals, the information received passes through one of the filters and causes a control voltage to be derived which not only deenergizes the tuner motor but also substitutes a second filter in the signal channel for the first filter so that the information is detected in the output of the receiver in spite of the overshoot of the motor and the driven tuning means.

In another type of operation according to the invention, particularly adapted to reception of information which is continuous, the above-mentioned control voltage, in addition to causing a second filter to be substituted in the signal channel for the first filter, also causes the tuner motor to operate at a reduced speed for a number of revolutions. At this low speed the motor can be brought to a halt manually while the signal is still present in the second filter. The presence of the signal within the second filter can be determined by observing the indication in an indicator in the output of the receiver signal channel. Because of the slow speed at which the motor is turning, it may be brought to a halt almost instantaneously upon opening a manual stop switch. In this way, overshoot of the motor and the tuning elements are negligible.

Other and further objects of this invention will be apparent as the description thereof progresses, reference being had to the accompanying drawings wherein.

Figure 1:
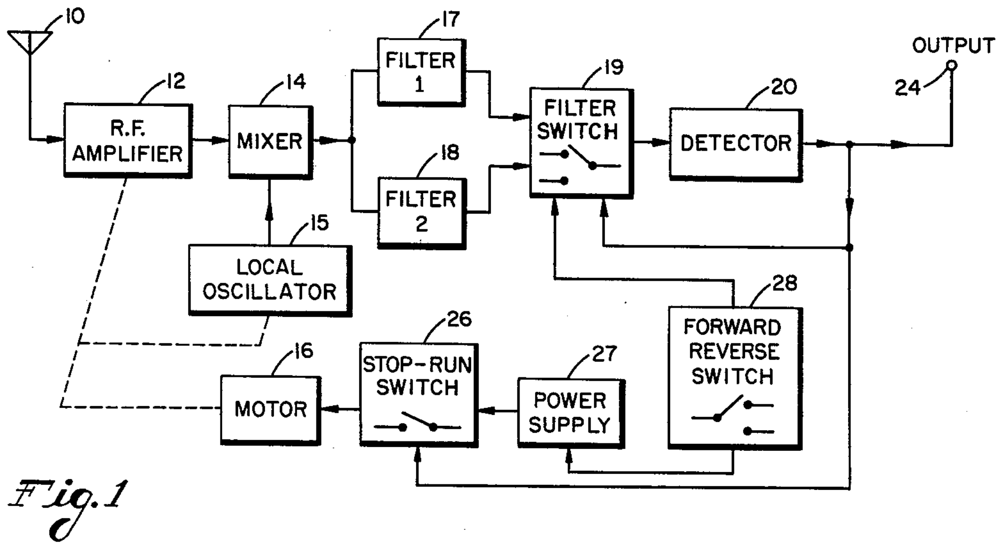
FIG. 1 is a diagram of a first system according to the invention.

In the drawings, wherein similar elements in the various figures are indicated by the same reference numerals, a signal seeking receiver is shown which includes an antenna 10 capable of receiving information signals; the antenna is coupled to a conventional radio frequency amplifier 12 which is included in the signal channel and which has one or more tuned circuits. The radio frequency amplifier, of course, may be omitted in some cases. The output of the radio frequency amplifier is supplied to a mixer or converter 14 which also is connected to a local oscillator 15. The local oscillator includes a tunable circuit whereby the local oscillator output frequency, which is mixed with the radio frequency signal from the radio frequency amplifier, can be changed. The tuned circuits of the radio frequency amplifier 12 and of the local oscillator 15 are ganged together and connected to the shaft of a direct current electric motor 16, as indicated schematically by the dashed lines. The intermediate frequency signal derived at the output of mixer 14 is applied to the two filter networks 17 and 18, each of which has a relatively narrow passband in order to maximize the ratio of signal to noise. One only of these filters is switched into the signal channel at any given instant by means of a filter switch 19. The output of the selected filter is applied to a detector 20 whose function is to derive a voltage whenever signal information of the desired characteristic is available. For example, if the information to be received and evaluated consists of two pulses spaced at a known interval, the detector 20 could take the form of a pulse coincidence detector wherein the signal is delayed by the pulse interval and the undelayed and delay signal are superimposed so as to obtain a resultant amplitude exceeding that of either pulse individually. By means of a limiting circuit, the detector could be made to respond only to a particular pair of pulses of the desired separation. The type of detector used will depend, of course, upon the characteristic of the desired signal information which is to be received and locked on. The detector also serves the normal function of detecting the incoming signal in a manner well known to those skilled in the receiver art. The detected signal is available at the output terminal 24 of the receiver.

The detector output derived during the presence of the desired signal causes operation of filter switch 19, which switch disconnects one of the filters from the receiver signal channel and connects the other filter into the receiver signal channel. In addition, the detector output serves to operate a stop-run switch 26 connected between the motor power supply 27 and motor 16. During the presence of an output from the detector, the stop-run switch is open, thus deenergizing the motor. A forward-reverse switch 28 also may be included in the arrangement according to FIG. 1 in the event that the local oscillator is to be swept in both directions. This forward-reverse switch 28 may be operated manually to cause the filters to be switched in the opposite sequence when the power supply to the motor is reversed. This forward-reverse switch may be operated automatically as the motor reaches one of two limiting positions in its travel.

Figure 2:
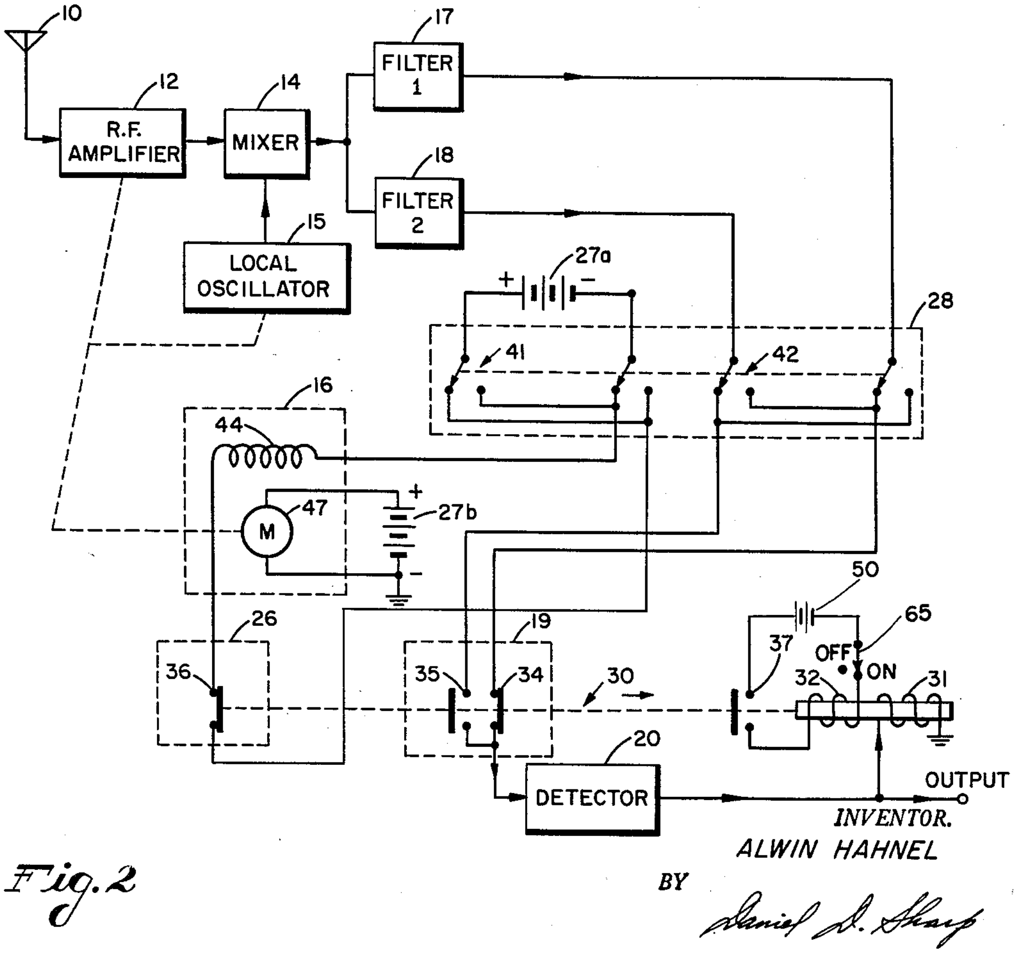
FIG. 2 is a diagram showing some of the circuit details necessary for operation of the system shown in FIG. 1.

Referring now to FIG. 2, a relay 30 is shown which includes an actuating coil 31, a holding coil 32, contacts 34, 35, 36, and a holding contact 37. Also included in the system of FIG. 2 are reversing switches 41 and 42 which are ganged together, as shown in FIG. 2. The switch 41 provides means for reversing the current in the field winding 44 of motor 16 by reversing the connections of the field winding to the terminal of unidirectional source 27*a*. The circuit for the field winding 44 of motor 16 is completed through contact 36 of stop-run switch 26. The switch 42 provides means for reversing the order of selection of filters 17 and 18 when the relay 30 is operated. The armature 47 of motor 16 is energized by a direct current source 27*b*. When the switch 42 is in the position shown in FIG. 2, the filter 17 is connected through switch 42 to contact 34 and filter 18 is connected to contact 35. When switch 42 is in the other position, filter 17 is connected through switch 42 to contact 35 and filter 18 is connected to contact 34. One of the contacts 34, 35 is normally closed while the other is normally open. The normal position is construed to be the position corresponding to an absence of a desired signal. The holding coil 32 is energized from a direct current source 50 when contact 37 of relay 30 is closed. A switch 65 may be provided in circuit with the holding coil 32 to deenergize the holding coil and condition the system for a subsequent tuning cycle.

In the absence of desired signal information, there is no output from the detector 20 and the relay coil 31 is deenergized. Contact 36 of the stop-run switch is closed so that the tuning motor 16 continues to run and the local oscillator sweep continues in a given direction. Filter 17 is connected through contact 34 to the detector 20 but there is, of course, no output at this time from filter 17. Filter 18 is disconnected from the circuit inasmuch as contact 35 is open. The holding relay coil 32 is deenergized since holding contact 37 of relay 30 is open.

Eventually, signal information of the desired characteristic appears at antenna 10 and, assuming the local oscillator is sweeping from a lower to a higher frequency, this signal information passes through filter 17 which is tuned to a frequency higher than that of filter 18—and thence through closed contact 34 to the detector 20. This detector senses that the desired information is present and an output is derived from the detector 20 only during the presence of this desired information. The relay coil 31 becomes energized by this output and relay 30 is actuated; consequently, contact 36 opens and the motor 16 is deenergized.

Because of the angular momentum of the rotating armature of the motor 16, the motor and the attached tuning means in the radio frequency amplifier 12 and local oscillator 15 will not come to a stop when the power supply is disconnected from the motor. Instead, the motor 16 will continue rotating for an interval during which the tuning means will have moved to a position corresponding to a change in frequency in the direction in which sweeping takes place. For example, if the local oscillator is sweeping at a rate of ten megacycles per second, an overshoot period (the period between the deenergization of the motor and the actual stopping of the motor) of one-tenth second would correspond to a frequency deviation of one megacycle. If the direction of rotation of motor 16 is such that the local oscillator is swept from a lower to a higher frequency, the intermediate frequency signal first passes through the filter having the higher center frequency, which may be filter 17. Upon receipt of the signal information, the motor continues to rotate after the deenergization to a position which corresponds to a higher local oscillator frequency or to a lower intermediate frequency. Consequently, the filter 18 is inserted into the signal channel at the time that the relay 30 is energized so that the signal remains in the intermediate frequency window during the overshoot period of the motor. If, on the other hand, the motor is reversed so that the local oscillator is swept from a higher to a lower frequency, the intermediate frequency signal should first pass through the filter having the lower center frequency, that is, filter 18. This requires that the filters in the circuit with contacts 35 and 36 be reversed simultaneously upon reversal of the tuner motor. Once the relay coil 31 has been energized and relay 30 actuated, the current from source 50 passes through closed contact 37 and coil 32 and maintains contacts 34—36 in the same position occupied at the time of arrival of the signal information; otherwise, the momentary loss of the signal during the switching period would cause relay 30 to be deactuated.

Figures 3, 4:
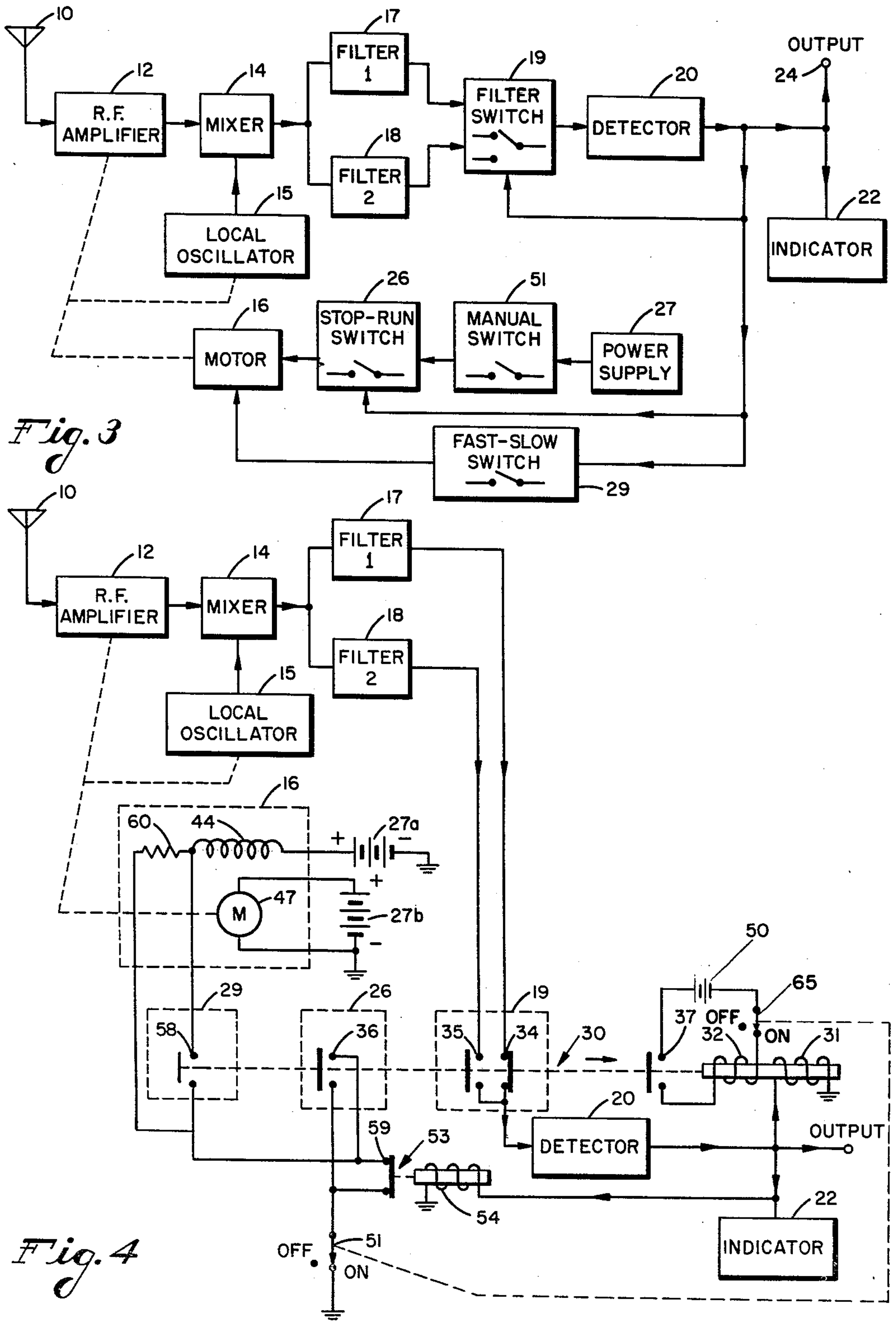
FIG. 3 is a diagram of a second system according to the invention.
FIG. 4 is a diagram illustrating some of the circuit details of the system of FIG. 3.

A modification of the system of FIGS. 1 and 2 is shown in FIGS. 3 and 4. Like reference numerals indicate the portions of the system of FIGS. 3 and 4 which corresponds to those of the system of FIGS. 1 and 2. The system of FIGS. 3 and 4 includes an indicator 22 in the output circuit of the detector 20, a fast-slow switch 29 for motor 16, and a manual on-off switch 51 for motor 16. The operation of the system of FIGS. 3 and 4 is similar to that of FIGS. 1 and 2 except that the tuner motor 16 which normally operates at a relatively high speed during the searching cycle is made to operate at a much lower speed upon receipt of information of the desired type (that is, during the presence of an output control voltage from detector 20). After the switching operation in relay 30 has been accomplished and the intermediate frequency signal passes through the second of the two filters (filter 18), the motor continues to run slowly until the indicator 22 provides a proper indication to the operator of the equipment that a signal to be evaluated is present. At this point, the tuner motor 16 can be brought to a complete standstill by manually opening switch 51. Since the tuner motor 16 is running very slowly during the presence of a control signal from detector 20, the overshoot of the motor after deenergization can be reduced to a negligible amount.

Referring to FIG. 4, the tuning motor is running at a fast speed while searching for a signal. Although contact 36 of relay 26 normally is open during the searching interval, the coil 54 of relay 53 is deenergized since there is no control voltage from detector 20 and contact 59 of relay 53 is closed. This provides a closed path for energizing the field winding 44 of motor 16 through contact 58 of fast-slow switch 29, contact 59 of relay 53 and manual switch 51. The filter 17 first passes the incoming intermediate frequency signal from mixer 14 and the signal continues through contact 34 of filter switch 19 to the detector 20. A control signal from detector 20 energizes relay coil 31 and relay 30 accomplishes three functions. First, it disconnects filter 17 from the signal channel and connects in filter 18. Second, it closes contact 36 of switch 26, thereby maintaining the motor field 44 energized in spite of opening contact 59. The contact 58 of fast-slow switch 29 is closed, thus placing a short across the motor field resistor 60 and reducing the motor speed. Finally, the holding relay 32 is energized by closure of ocntact 37, whereupon the relay 30 remains actuated so long as switch 65 is closed and so long as a desired signal is present and an accompanying control signal is present at the output of detector 20.

It will be noted that the relay 53 permits the tuner motor 16 to continue rotating at a slow speed even after the intermediate frequency signal has passed through filter 17. The tuner motor will continue to rotate slowly until the intermediate frequency passes through filter 18 and is indicated on indicator 22. While the detected signal is still present, the tuning motor may be stopped by opening the manual switch 51. The switch 65 may be ganged with switch 51 so that relay 30 may be deenergized after deenergization of the motor and the system set up for a subsequent tuning cycle at such time as the switches 51 and 65 are again switched to the On position.

Provisions may be made in the systems of FIGS. 3 and 4, just as in the systems of FIGS. 1 and 2, to reverse the direction of sweep in the order of selection of filters 17 and 18 simultaneously.

This invention is not limited to the particular details of construction, materials and processes described, as many equivalents suggest themselves to those skilled in the art. It is, accordingly, desired that the appended claims be given a broad interpretation commensurate with the scope of the invention within the art.

What is claimed is:

1. A signal seeking receiver comprising tunable input circuit means for receiving incoming signals, a variable tuning means for tuning said input circuit means, electromechanical means for effecting variation of said tuning means, said electromechanical means being subject to overshoot whereby said tuning means continues to be varied for a predetermined period following deenergization of said electromechanical means, a control means productive of a control voltage only during the presence of an incoming signal having a predetermined desired character, a signal channel including said input circuit means and further including band-pass filter means for passing a relatively narrow band of frequencies over a region of the frequency spectrum, said control means including means responsive to said control voltage for selecting a different region of the frequency spectrum over which a narrow band of frequencies is passed by said band-pass filter means, said control means further including means also responsive to said control voltage for reducing substantially the speed of said electromechanical means, and means for stopping said electromechanical means during the presence of said desired signal.

2. A signal seeking receiver comprising tunable input circuit means for receiving incoming signals, variable tuning means for tuning said circuit means, electromechanical means for effecting variation of said tuning means, said electromechanical means being subject to overshoot owing to inertia whereby said tuning means continues to be varied for a predetermined period following deenergization of said electromechanical means, said receiver further including means for detecting the incoming signals passing through said tunable input circuit means, first and second frequency selective signal transmission means alternatively connected between said input circuit means and said detecting means, control means coupled to said detecting means and energized only when an incoming signal of predetermined character is received and detected for simultaneously deenergizing said electromechanical means and for connecting a different one of said signal transmission means in circuit with said input circuit means and said detecting means during said predetermined period.

3. A signal seeking receiver as recited in claim 2 wherein said first and second signal transmission means have band-pass characteristics of differing center frequency.

4. A signal seeking receiver comprising tunable input circuit means for receiving incoming signals, variable tuning means for tuning said input circuit means, electromechanical means for effecting variation of said tuning means, said electromechanical means being subject to overshoot owing to inertia whereby said tuning means continues to be varied for a predetermined period following deenergization of said electromechanical means, detecting means for detecting said incoming signals and for deriving an output control voltage when said incoming signal has a predetermined desired character, frequency sensitive transmission means for passing a relatively narrow band of frequencies over a first region of the frequency spectrum, a signal channel including said input circuit means, said transmission means and said detecting means in the order named, control means actuated by said detector output control voltage only during reception and detection of said desired signal for shifting the passband of said transmission means to a different region of the frequency spectrum during and after said predetermined period.

5. A signal seeking receiver as recited in claim 2 wherein said first and second signal transmission means comprise first and second filters having their center frequencies offset by an amount dependent upon the frequency band searched by said tuning means during the period of overshoot of said electromechanical means.

6. A signal seeking receiver comprising tunable input circuit means for receiving incoming signals, means including an electromechanical device for tuning said input circuit means to search in either direction for a signal of a predetermined desired character, detecting means for detecting said incoming signal and for providing a distinctive output voltage when said incoming signal is of the aforesaid desired character, a signal channel for passing said incoming signals and including said input circuit means, frequency selective means and said detecting means, said frequency selective means including first and second filters having their center frequencies displaced, said signal channel initially including said first filter whose center frequency, compared with that of the second filter, lies in the frequency spectrum in the direction of searching, control means actuated by said output voltage for deenergizing said electromechanical device, said electromechanical device continuing to operate for a period following deenergization owing to inertia, said control means when actuated in response to said distinctive output from said detecting means switching out said first filter and coupling the second of said filters into said signal channel during the aforementioned period.

7. A signal seeking receiver as recited in claim 6 and further incuuding means for reversing the direction of searching, and means for reversing the order of selection of said filters during reversal of the direction of variation of searching.

8. A signal seeking receiver comprising tunable input circuit means for receiving an incoming signal, variable tuning means for varying said input circuit means, electromechanical means for effecting variation of said tuning means, said electromechanical means being subject to overshoot whereby said tuning means continues to be varied for a predetermined period following deenergization of said electromechanical means, a signal channel including said input circuit means, transmission means for passing a relatively narrow band of frequencies and detecting means for detecting said incoming signal and for producing an output voltage only during the presence of an incoming signal having a predetermined desired characteristic, said transmission means comprising a first filter and a second filter only one of which is inserted in said signal channel at any given instant, and control means energized by said detector output voltage for substituting the other of said filters in said signal channel for selecting a different region of the frequency spectrum over which a narrow band of frequencies is passed by said circuit means during the overshoot period.

9. A signal seeking receiver as recited in claim 8 and further including means for reversing the direction of variation and of said electromechanical means, and means for reversing the order of selection of said filters during reversal of the direction of variation of said electromechanical means.

References Cited in the file of this patent

UNITED STATES PATENTS

| | | |
|---|---|---|
| 1,930,029 | Alden | Oct. 10, 1933 |
| 2,174,566 | Case | Oct. 3, 1939 |
| 2,452,878 | Tittle | Nov. 2, 1948 |
| 2,497,524 | Wiley | Feb. 14, 1950 |
| 2,622,202 | Gierwiatowski | Dec. 16, 1952 |
| 2,880,311 | Bray | Mar. 31, 1959 |